United States Patent
Smiling et al.

(10) Patent No.: US 9,183,261 B2
(45) Date of Patent: Nov. 10, 2015

(54) LEXICON BASED SYSTEMS AND METHODS FOR INTELLIGENT MEDIA SEARCH

(71) Applicant: Shutterstock, Inc., New York, NY (US)

(72) Inventors: Eric J. Smiling, Jersey City, NJ (US); Andrew Rodland, East Rutherford, NJ (US)

(73) Assignee: Shutterstock, Inc., New York, NY (US)

( * ) Notice: Subject to any disclaimer, the term of this patent is extended or adjusted under 35 U.S.C. 154(b) by 12 days.

(21) Appl. No.: 13/729,653

(22) Filed: Dec. 28, 2012

(65) Prior Publication Data

US 2014/0188931 A1 Jul. 3, 2014

(51) Int. Cl.
*G06F 17/30* (2006.01)

(52) U.S. Cl.
CPC .................. *G06F 17/30545* (2013.01)

(58) Field of Classification Search
USPC ................ 707/706, 722, 759, 765, 769, 770; 345/744, 503, 418; 715/719
See application file for complete search history.

(56) References Cited

U.S. PATENT DOCUMENTS

| | | | |
|---|---|---|---|
| 4,952,922 A | 8/1990 | Griffin | |
| 5,091,960 A | 2/1992 | Butler | |
| 5,754,750 A * | 5/1998 | Butterfield et al. | 345/418 |
| 6,337,691 B1 | 1/2002 | Trainer | |
| 6,338,062 B1 | 1/2002 | Liu | |
| 6,502,105 B1 | 12/2002 | Yan | |
| 6,529,242 B1 | 3/2003 | Panicacci | |
| 6,654,022 B1 | 11/2003 | Egan | |
| 6,671,424 B1 | 12/2003 | Skoll | |
| 6,763,137 B1 | 7/2004 | Krtolica | |
| 6,865,302 B2 | 3/2005 | Chang | |
| 6,901,378 B1 | 5/2005 | Linker | |
| 6,915,001 B2 | 7/2005 | Tachibana et al. | |
| 6,956,899 B2 | 10/2005 | Hall | |
| 6,956,979 B2 | 10/2005 | Janakiraman | |
| 7,051,019 B1 | 5/2006 | Land | |
| 7,099,389 B1 | 8/2006 | Yu | |
| 7,099,860 B1 | 8/2006 | Liu | |
| 7,113,944 B2 | 9/2006 | Zhang | |
| 7,181,678 B2 | 2/2007 | Chundi | |
| 7,236,652 B2 | 6/2007 | Kasutani | |
| 7,248,738 B2 | 7/2007 | Ho | |
| 7,257,567 B2 | 8/2007 | Toshima | |

(Continued)

OTHER PUBLICATIONS

Benjamin B. Bederson, Quantum Treemaps and Bubblemaps for a Zoomable Image Browser, Human-Computer Interaction Laboratory, Computer Science Department, Institute for Advanced Computer Studies, University of Maryland, College Park, MD 20742; http://www.cs.umd.edu/hcil/photomesa.

(Continued)

*Primary Examiner* — Hung T Vy

(74) *Attorney, Agent, or Firm* — McDermott Will & Emery LLP

(57) ABSTRACT

A computer image search system for rapid retrieval of media files images corresponding to a sequence of input display commands, the system comprising: a programmable data processor operating under the control of a program to convert the display commands into data entries in an array of multi-bit data characters and words, each entry of the array corresponding to a set of descriptions of the image to be displayed; and a scanned-raster display device for generating illuminated points on a display surface in response to applied data signals causing the programmable data processor to perform a set of operations.

16 Claims, 10 Drawing Sheets

(56) References Cited

U.S. PATENT DOCUMENTS

| | | | |
|---|---|---|---|
| 7,440,638 B2 | 10/2008 | Nagahashi | |
| 7,519,227 B1 | 4/2009 | Syeda-Mahmood | |
| 7,529,732 B2 | 5/2009 | Liu | |
| 7,558,425 B1 | 7/2009 | Syeda-Mahmood | |
| 7,797,377 B2 | 9/2010 | Linker | |
| 7,797,635 B1 | 9/2010 | Denise | |
| 7,836,044 B2 | 11/2010 | Kamvar | |
| 7,908,559 B1 | 3/2011 | Denise | |
| 7,934,161 B1 | 4/2011 | Denise | |
| 8,078,969 B2 | 12/2011 | Harrison | |
| 8,121,618 B2 | 2/2012 | Rhoads | |
| 8,140,518 B2 | 3/2012 | Dasdan | |
| 8,156,109 B2 | 4/2012 | Kamvar | |
| 8,175,617 B2 | 5/2012 | Rodriguez | |
| 8,194,986 B2 | 6/2012 | Conwell | |
| 8,196,045 B2 * | 6/2012 | Chandratillake et al. | 715/719 |
| 8,255,495 B1 | 8/2012 | Lee | |
| 8,400,466 B2 | 3/2013 | Yamamoto | |
| 2002/0033844 A1 * | 3/2002 | Levy et al. | 345/744 |
| 2003/0001850 A1 * | 1/2003 | Katsura et al. | 345/503 |
| 2005/0283468 A1 * | 12/2005 | Kamvar et al. | 707/3 |
| 2006/0248044 A1 | 11/2006 | Zhang | |
| 2008/0082497 A1 * | 4/2008 | Leblang et al. | 707/3 |
| 2008/0120291 A1 * | 5/2008 | Delgo et al. | 707/5 |
| 2008/0205789 A1 | 8/2008 | Kate | |
| 2009/0064029 A1 | 3/2009 | Corkran | |
| 2010/0046842 A1 | 2/2010 | Conwell | |
| 2010/0048242 A1 | 2/2010 | Rhoads | |
| 2010/0205628 A1 | 8/2010 | Davis | |
| 2010/0262512 A1 | 10/2010 | Lee | |
| 2010/0277754 A1 | 11/2010 | Arimura | |
| 2011/0034176 A1 | 2/2011 | Lord et al. | |
| 2011/0074824 A1 | 3/2011 | Srinivasan | |
| 2011/0098029 A1 | 4/2011 | Rhoads | |
| 2011/0098056 A1 | 4/2011 | Rhoads | |
| 2011/0143811 A1 | 6/2011 | Rodriguez | |
| 2011/0161076 A1 | 6/2011 | Davis | |
| 2011/0173183 A1 | 7/2011 | Dasdan | |
| 2011/0173214 A1 | 7/2011 | Karim | |
| 2011/0197237 A1 | 8/2011 | Turner | |
| 2011/0202557 A1 | 8/2011 | Atsmon | |
| 2011/0212717 A1 | 9/2011 | Rhoads | |
| 2011/0244919 A1 | 10/2011 | Aller | |
| 2011/0258183 A1 | 10/2011 | Gibbs | |
| 2011/0280447 A1 | 11/2011 | Conwell | |
| 2011/0281566 A1 | 11/2011 | Davis | |
| 2011/0282793 A1 | 11/2011 | Mercuri | |
| 2011/0282947 A1 | 11/2011 | Dodson | |
| 2011/0282965 A1 | 11/2011 | Dodson | |
| 2011/0283305 A1 | 11/2011 | Davis | |
| 2011/0283306 A1 | 11/2011 | Davis | |
| 2011/0283310 A1 | 11/2011 | Davis | |
| 2011/0283319 A1 | 11/2011 | Davis | |
| 2011/0283328 A1 | 11/2011 | Davis | |
| 2011/0295722 A1 | 12/2011 | Reisman | |
| 2011/0320019 A1 | 12/2011 | Lanciani | |
| 2012/0050525 A1 | 3/2012 | Rinner | |
| 2012/0054649 A1 | 3/2012 | Mcdonald | |
| 2012/0075433 A1 | 3/2012 | Tatzgern | |
| 2012/0076471 A1 | 3/2012 | Ciudad | |
| 2012/0114249 A1 | 5/2012 | Conwell | |
| 2012/0149432 A1 | 6/2012 | Lablans | |
| 2012/0149470 A1 | 6/2012 | Dasdan | |
| 2012/0165046 A1 | 6/2012 | Rhoads | |
| 2012/0189211 A1 | 7/2012 | Luo et al. | |
| 2012/0190404 A1 | 7/2012 | Rhoads | |
| 2012/0191508 A1 | 7/2012 | Gross | |
| 2012/0191619 A1 | 7/2012 | Gross | |
| 2012/0191757 A1 | 7/2012 | Gross | |
| 2012/0209586 A1 | 8/2012 | Mieritz | |
| 2012/0218436 A1 | 8/2012 | Rhoads | |
| 2012/0220311 A1 | 8/2012 | Conwell et al. | |
| 2012/0229600 A1 | 9/2012 | Zhang | |
| 2012/0229613 A1 | 9/2012 | Yoshida | |
| 2012/0230463 A1 | 9/2012 | Morton | |
| 2012/0230549 A1 | 9/2012 | Takahashi | |
| 2012/0232987 A1 | 9/2012 | Everingham | |
| 2012/0233141 A1 | 9/2012 | Lambie | |
| 2012/0233143 A1 | 9/2012 | Everingham | |
| 2012/0233196 A1 | 9/2012 | Wu | |
| 2012/0236201 A1 | 9/2012 | Larsen | |
| 2012/0239671 A1 | 9/2012 | Chaudhri | |

OTHER PUBLICATIONS

Mumtaz Ali, Awais Adnan, MuhammdSaqib and Zahidullah, Content Based Image Retrieval (CBIR) UsingMaterialized Views, International Conference on Computer Science and Information Technology (ICCSIT'2011) Pattaya Dec. 2011; 116-119.

Deng Cai, Xiaofei He, Zhiwei Li Wei-Ying Ma, and Ji-Rong Wen Hierarchical Clustering of WWW Image Search Results Using Visual, Textual and Link Information MM'04, Oct. 10-16, 2004, New York, New York, USA. pp. 952-959.

B. Everitt, S. Landau, and M. Leese, "Cluster Analysis", London:Arnold, 2001.

Frode Eika Sandnes, A Configurable Photo Browser Framework for Large Image Collections, Faculty of Engineering, Oslo University College, N-0130 Oslo, Norway; https://oda.hio.no/jspui/handle/10642/882.

Hao Liu, Xing Xie, Xiaoou Tang, Zhi-Wei Li, Wei-Ying Ma, Effective Browsing of Web Image Search Results, Microsoft Research Asia, MIR'04, Oct. 15-16, 2004, New York, New York, USA. Copyright 2004 ACM 1-58113-940-3/04/001.

Chaoli Wang, John P. Reese, Huan Zhang, Jun Tao, Robert J. Nemiroff, iMap—A Stable Layout for Navigating Large Image Collections with Embedded Search, Chaoli Wang, John P. Reese, Huan Zhang, Jun Tao, Robert J. Nemiroff Michigan Technological University, Computer Science Technical ReportCS-TR-12-01, Jan. 11, 2012; www.cs.mtu.edu/~chaoliw/research/vda13-imap.pdf.

Huiyu Zhou*, Abdul H. Sadka, Mohammad R. Swash, Jawid Azizi and Abubakar S. Umar, Content Based Image Retrieval and Clustering: A Brief Survey, Recent Patents on Electrical Engineering 2009, 2, 187-199 187.

Wei-Ying Ma, B. S. Manjunath, NeTra: A toolbox for navigating large image databases, Multimedia Systems 7: 184-198 (1999) Multimedia Systems.

Wang JZ, Li J, Wiederhold G. Simplicity: Semantics-sensitive integrated matching for picture libraries. IEEE Trans Pattern Anal Machine Intell 2001; 23: 947-963.

Jin J, Kurniawati R, Xu G, Bai X. Using browsing to improve content-based image retrieval. J Visual Commun Image Represent 2001; 12: 123-135.

Vellaikal A, Kuo C. Hierarchical clustering techniques for image database organization and summarization. In Multimedia Storage and Archiving Systems III, Proc. SPIE 3527 1998;68-79.

Zhou XS, Huang TS. Relevance feedback in image retrieval: A comprehensive review. Multimedia Syst 2003; 8: 536-544.

A Fast Image Retrieval System using Index Lookup Table on Mobile Device, Junyeong Yang, Sanghyuk Park, Hacheon Seong, Hyeran Byun, IEEE (2008).

Rui Xu, Donald Wunsch II, "Survey of Clustering Algorithms", IEEE Transactions on Neural Networks, vol. 16, No. 3, May 2005.

Ritendra Datta, Dhiraj Joshi, Jia Li, And James Z. Wang, "Image Retrieval: Ideas, Influences, and Trends of the New Age", ACM Computing Surveys, vol. 40, No. 2, Article 5, Publication date: Apr. 2008.

Tamura et al. "Texture Feautres Corresponding to Visual Perception"—IEEE Trans on system, Man and cyber 8-460-472-1978.

Sanjoy Kumar Saha et al. "CBIR Using Perception Based Texture and Colour measures "CSE Department; CST Department Jadavpur Univ., India; B.E. College, Unit ISI, Kolkata, India—2003.

Canny, J., "A computational approach to edge detection", IEEE Trans on Pattern Analysis and Machine Intelligence, 8:679-698, 1986.

S.Nandagopalan, Dr. B.S. Adiga, and N. Deepak "A Universal Model for Content-Based Image Retrieval" World Academy of Science, Engineering and Technology 46 2008.

V. Castelli and L. D. Bergman (Eds.), "Image Databases: Search and Retrieval of digital Imagery", Wiley: New York, 2002.

(56) References Cited

OTHER PUBLICATIONS

A. Jain and R. Dubes, "Algorithms for Clustering Data", Englewood Cliffs, NJ:Prentice-Hall, 1988.

A. Baraldi and E. Alpaydin, "Constructive feedforward ART clustering networks—Part I and II," IEEE Trans. Neural Netw., vol. 13, No. 3, pp. 645-677, May 2002.

S. Thilagamani and N. Shanthi , "A Survey on Image Segmentation Through Clustering", International Journal of Research and Reviews in Information Sciences , vol. 1, No. 1, Mar. 2011.

I. J. Cox, M. L. Miller, T. P. Minka, T. V. Papathomas and P.Yianilos, "The Bayesian Image Retrieval System, PicHunter: Theory, Implementation and Psychophysical Experiments", IEEE Trans. Image Processing, vol. 9, No. 1, pp. 20-37, 2000.

Y. Rui, T. S. Huang, M. Ortega and S. Mehrotra, "Relevance Feedback: A Power Tool for Interactive Content-Based Image Retrieval", IEEE Trans. Circuits and Video Technology, vol. 8, No. 5, pp. 644-655, 1998.

Flickner M, Sawhney H, Niblack W, et al. Query by image and video content: The QBIC syst Comput 1995; 28: 23-32.

Pentland A, Picard R, Scaroff S. Photobook: Content-based manipulation for image databases. Int J Comput Vision 1996; 18:233-254.

Junyeong Yang, Sanghyuk Park, Hacheon Seong, Hyeran Byun, A Fast Image Retrieval System using Index Lookup Table on Mobile Device, IEEE (2008).

Ho, J., Lim, J., Yang, M.-H.: Image clustering with metric, local linear structure, and affine symmetry, US20077248738 (2007).

Mohammed Eisa and Ibrahim Elhenawy and A. E. Elalfi and Hans Burkhardt, "Image Retrieval based on Invariant Features and Histogram Refinement", ICGST International Journal on Graphics, Vision and Image Processing, Mar. 2006, pp. 7-11.

B. Everitt, S. Landau, and M. Leese, "Cluster Analysis", London: Arnold, 2001.

V. Cherkassky and F. Mulier, "Learning From Data: Concepts, Theory, and Methods", New York: Wiley, 1998.

Gupta A, Jain R. Visual information retrieval. Commun ACM 1997; 40: 70-79.

Zhou H, Yuan Y, Sadka AH. Application of semantic features in face recognition. Pattern Recognit 2008; 41: 3251-3256.

Smith J, Chang S-F. Visualseek: A fully automated content-based image query system. In multimedia'96: Proc. Of the Fourth ACM Int Conf on Multimedia 1996; 87-98.

Ma W, Manjunath B. Netra: A toolbox for navigating large image databases. In Proc. Int Conf on Image Process 1997; 1: 568-571.

Eakins J, Graham M. Content-based image retrieval. University of Northumbria at Newcastle. Tech Rep Technical Report, 1999.

* cited by examiner

LEXICON BASED SYSTEMS AND METHODS FOR INTELLIGENT MEDIA SEARCH

BACKGROUND

1. Field of Disclosure

The present disclosure generally relates to a media search and retrieval system, and, more particularly, to systems and methods for rapid retrieval of searched media files that uses a first database containing suggested search terms and associated pointers to media files in a second database for autocompleting user requests.

2. Brief Description of Related Art

Presently, many multimedia databases are available on the Internet. These databases are often used by users around the world for searching multimedia files. Many challenges exist in the field of media searching. The first challenge is the difficulty of locating a media file in a large and varied collection of multimedia files. The second challenge is the speed of locating a specific multimedia file in a large database of multimedia files. A number of retrieving systems have been established that are unable to meet these challenges. Typically these systems include mechanisms that perform a search by designating a name of a file (cat.jpg) or an image number (cat001.jpg). These systems either perform a keyword search (a search using a keyword assigned to each image in advance) or perform a full text search (a search using an arbitrary term included in the content of the media files). These text query based search systems also require an operation of designating a scope of a search, and often result in causing an enormous amount processing overhead.

For performance enhancement, classical image retrieval systems have been focused on the features of data extraction and selection, data representation and similarity measures. In recent years, some commercial products and experimental prototype systems have been successfully developed, including but not limited to: QBIC, Photobook, Virage, Visualseek, Netra and Simplicity. In the aforementioned systems, the time required for media file retrieval is primarily dependent upon database size. Thus, these systems are not suitable for large, multimedia based commercial applications. Using the aforementioned systems for searching large media file databases may be cost prohibitive. For example, keyword-based media retrieval systems may find correspondences by matching keywords from a user input to the keywords that have been manually associated with the images in the database. However, in these systems, searching media files that do not have appropriate keywords associated with them can be extremely difficult. For example, if the keywords are inaccurate searching and finding the media files can be made extremely difficult. Often "relevance feedback" techniques utilizing user feedback to understand the relevance of selected exemplary media files are employed to search such media files and to reduce inter alia searching time.

Keywords-based image retrieval systems generally find correspondences by matching keywords from a user input to the keywords that have been manually attached to the images in the database. However, some images may not have appropriate keywords to describe themselves and therefore the image search can be seriously affected. One solution is to apply "relevance feedback" techniques that utilize user feedback to gain an understanding as to the relevance of selected exemplary images and hence reduce possible errors or redundancy. For example, U.S. Pat. No. 7,181,678 (2007) teaches a method of using a Bayesian classifier technique to determine the distribution of the query space for positive hits, using feedback information to update each iteration in order to improve searching results accuracy. The major drawback of this method sacrifices searching speed as the level of computation increases with each iteration. Eigenvalue and spectral clustering methods, such as those taught by U.S. Pat. No. 6,763,137 (2004), teach rapid image searching using eigenvalues and clustering or grouping of objects for recognition purposes. Although the eigenvalue systems run relatively fast, they may compromise media retrieval accuracy. Graph based clustering methods such as those taught by U.S. Pat. No. 7,113,944 (2006), store images in a hybrid matrix, which in turn is clustered by a content-based clustering algorithm, where vector represents an image in the hybrid matrix. For each image in the matrix, a log-based document is constructed and stored in the hybrid matrix. Although this methodology has better media file retrieval accuracy, using this methodology may have an adverse impact on speed and efficiency of the media searches.

Media search user interfaces typically include an input box, a search button (can also be a "submit" or "go" button) and a display area. Searchers enter a search term in the input box, and click on the search button before search results are displayed on the display area of the user interface. Frequently, while searchers are entering a search term, search engines may present a drop down list of prospective search terms to help searchers define a search term. Searchers often select search terms from the presented list, click on search button, and review the results produced by the selected search term. During the search process, unless the selected search term produces the intended result, typically searchers move on to select a different search term. Generally a progressive search term selection process starts at a coarse phase, when user enters a partial search term, and finally leads to a refinement phase, where searcher is satisfied with the result produced by the selected search term. Typically, as searchers experiment with search terms, searchers may have to select a search term, click on a "submit" or "go" button and wait to see the results generated by the selected search term. In other words, even though searchers are able to view a dropdown list of possible search terms while searchers are entering a search term, searchers are unable to view the search results produced by a prospective search term before clicking on the "submit" or "go" button.

Currently available methods allow a user to search and retrieve media files. However, the conventional methods do not provide high processing speed, optimum use of storage space and cost efficient structure that supports rapid searching and accurate retrieval of media files. Accordingly, there is a need for an improved systems and methods supporting rapid search and accurate retrieval of the media files.

BRIEF SUMMARY

By way of introduction only, the present invention provides methods and systems for rapid retrieval of searched media files. The methods and systems may include maintaining a first database comprising a media file set and descriptive terms associated with the media file set, maintaining a second database comprising a set of lists, each list comprising a list designation, suggested search terms and pointers associated with the suggested search terms, wherein the pointers point to media file sets in the first database. Upon receiving a search request from a user interface, a list in the second database is detected, wherein the associated list designation of the detected list begins with the received search request, each suggested search term in the detected list is processed in the following manner: a pointer associated with the suggested search term is identified, and using the identified pointer, the media file set and the descriptive terms associated with the suggested search term are retrieved from the first database, and displayed on the user interface.

The foregoing discussion of the preferred embodiments has been provided only by way of introduction. Nothing in this section should be taken as a limitation of the claims, which define the scope of the invention.

DETAILED DESCRIPTION OF PREFERRED EMBODIMENTS

Figure 1:
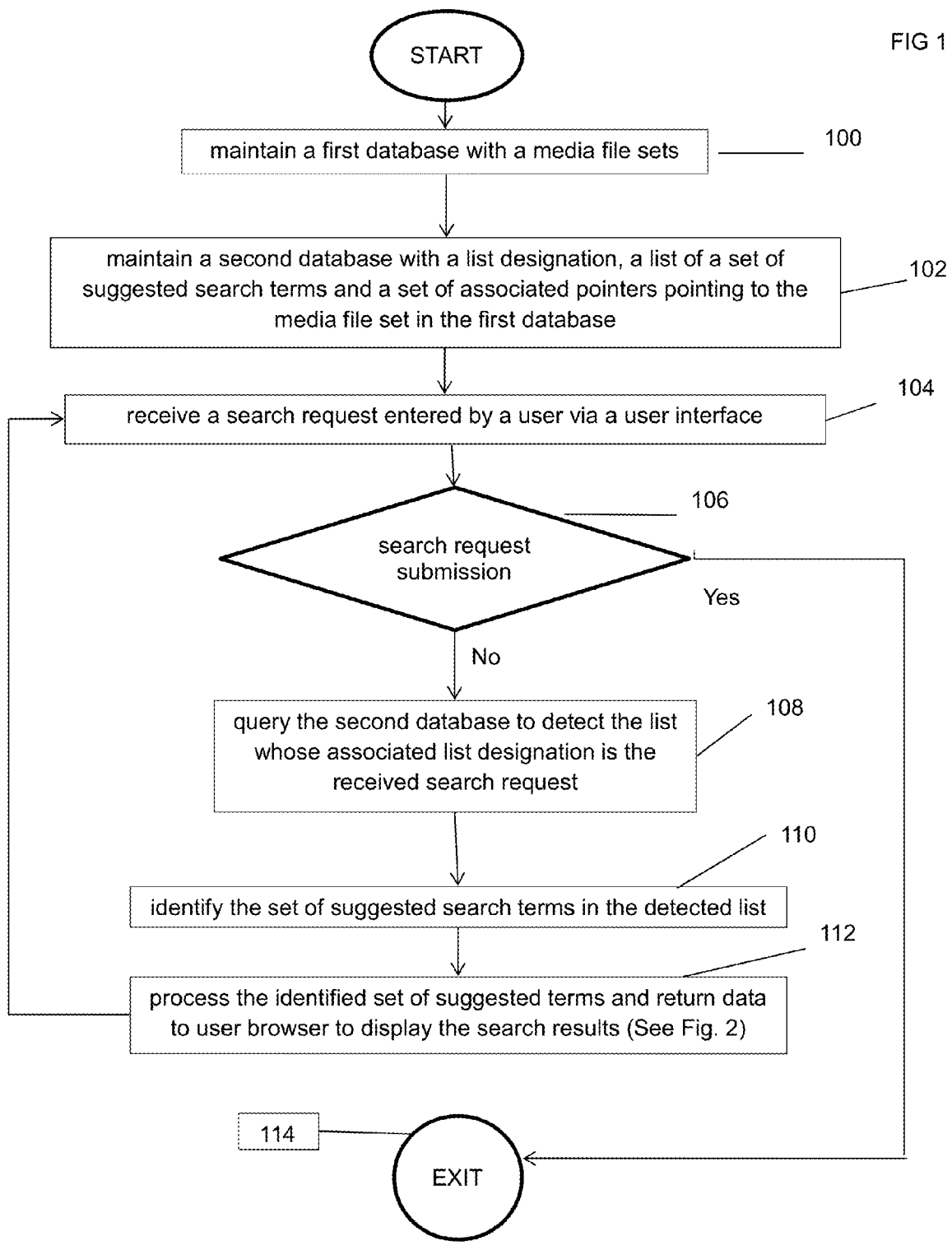
FIG. 1 illustrates a state diagram showing operations performed in the processing a user search request.

The present disclosure describes computer implemented systems and methods, that may utilize an algorithm, for use in a graphical user interface employing efficient search strategies for conducting a media file search. In addition to displaying search results rapidly, the disclosed method also presents search results in a visually pleasing format. The disclosed method encourages users to experiment with several possible alternative search terms before designating a search term.

One disclosed method of the present invention conducts rapid media searches by dividing image search processing load between a client and a server. This technique addresses users need for conducting an instantaneous media search. A set of search results is pre-computed on the server side, and sent to the client. The client then displays the search results on the user interface. This distribution of work between the client and the server not only minimizes the client side work load, but also results in rapid search of the desired media files. In one embodiment, the server may generate multiple sets of search results such as target search results sets, related search results sets, synonymous search results set and the like. Based on the user preferences and configuration, the server may send one or more of the generated search result sets to the client.

In another embodiment, the disclosed system pre-generates media search results by maintaining a first database comprising a media file set and descriptive terms associated with the media file set, a second database comprising a plurality of lists, each list comprising a list designation, an alphabetized set of pre-computed suggested search terms and a set of associated pointers. The set of associated pointers in the second database is configured such that for each suggested search term in the list, the associated pointer points to the media file set in the first database that represents the suggested search term. The method iteratively receives a search request entered by a user via a user interface until the user concludes the search request submission.

The method queries the second database to detect the list, wherein the associated list designation of the list begins with the received search request. Next, the method identifies the set of suggested search terms in the detected list, and for each suggested search term in the identified set of suggested search terms, the method identifies a pointer associated with the suggested search term from the set of associated pointers in the detected list. Then, using the identified pointer, the method retrieves the media file set and the descriptive terms associated with the suggested search term from the first database and dynamically updates the user interface by displaying the retrieved media file set and the descriptive terms associated with the suggested search term on the user interface.

As discussed above, conventional search systems have a one stop process where search results are displayed upon a user entering a search term and clicking on the search button. Unlike many existing media file search systems, search term selection of the disclosed system is not a one step process. In contrast, the disclosed search system proposes progressive search term selection, which begins with a generic/partial search term, based on which the system dynamically proposes many alternative search terms and representation of media files associated with the proposed search terms.

Figure 9:
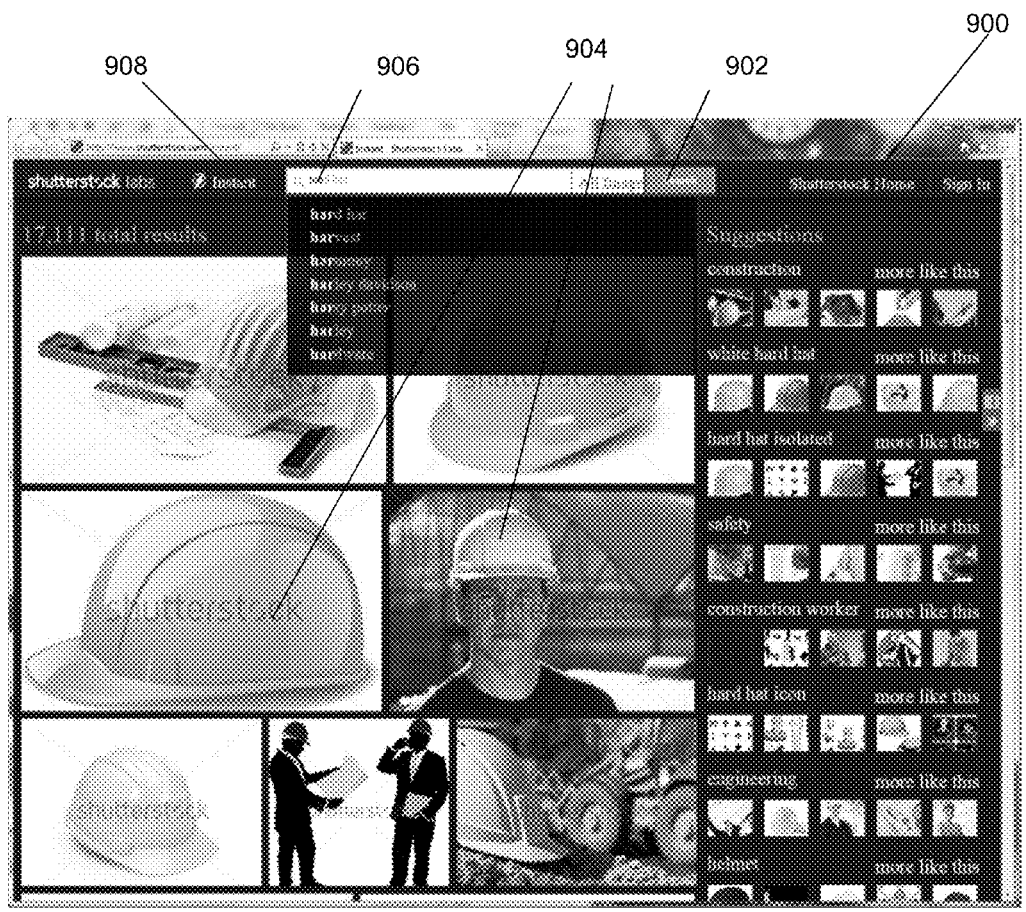
FIG. 9 illustrates a screen shot of the user interface resulting from the searcher entering the partial search term "har"
Figure 10:
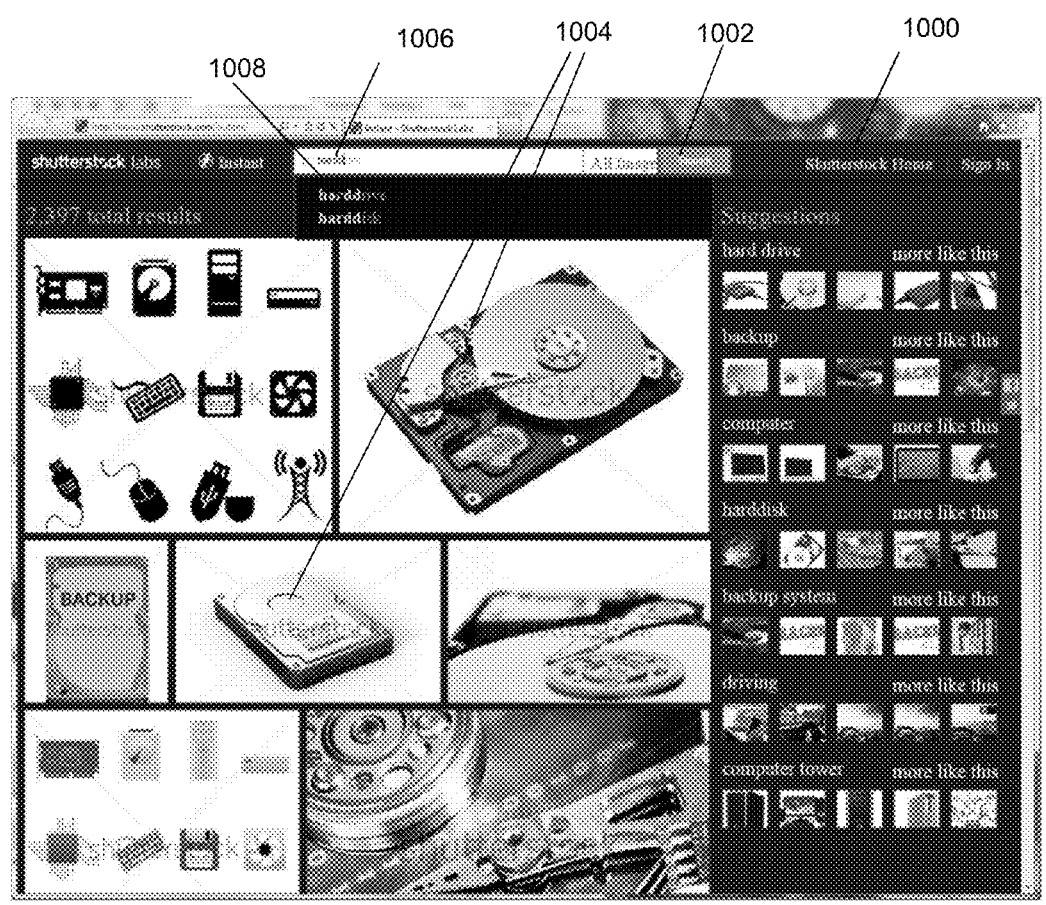
FIG. 10 illustrates a screen shot of the user interface resulting from the searcher entering the partial search term "hardd".

Referring now to the drawing, this feature of the disclosed method is illustrated in FIG. 9 and FIG. 10. A searcher using the disclosed method is attempting to locate media files that are related to term "hard drive." Now referring to FIG. 9, where a searcher has started entering, but has not completely entered search term "hard drive" in the input box 906 on the user interface 900. The partial search term displayed in the input box 906 is "har" and the suggested search terms displayed in the drop down list 908 are hard hat, harvest, harmony, Harley Davidson, Harry Potter, Harley, and hardware. It is noted that the images 904 displayed below the partial search term "har" in the input box 906 are the images that are related to search term "hard." The images 904 are displayed while the searcher is in the process of entering the partial search request. It is appreciated that images 904 are displayed without the searcher clicking on search button 902.

Now referring to FIG. 10. FIG. 10 illustrates a screen shot of the user interface 1000 as the searcher concatenates the next two characters to the partial search term "har" in the input box 1006. The partial search term now reads "hardd" and suggested search terms displayed in the drop down list 1008 are hard drive and hard disk. Consequently, the images 1004 displayed below the partial term "hardd" in the input box 1006 are the images that are related to terms hard drive and hard disk. Images 1004 are displayed without the searcher clicking on the search button 1002. Thus, searchers are able to view alternative suggested search terms along with media file representation of the alternative suggested search terms before clicking on the search button. Having a dynamic user interface that represents not only the alternative suggested search terms but also indication of media files representing the alternative suggested search terms leads to more rapid and accurate searching of pertinent media files.

Referring now to FIG. 1, which is a state diagram showing various operations performed in processing a user search request.

FIG. 1 describes a method for rapid retrieval of searched media files. At block 100, a first database containing a media file set and a set of descriptive terms associated with the media file set is maintained. At block 102, a second database comprising a plurality of lists, each list comprising a list designation, an alphabetized set of pre-computed suggested search terms, and a set of associated pointers is maintained. The set of associated pointers is configured such that for each suggested search term in the list, the associated pointer points to the media file set in the first database that is associated with the suggested search term. An exemplary layout of a first database and a second database is illustrated in FIG. 4.

Notably, both the first database and the second database have an ability to hold an enormous amount of data. A large number of media files of various types, including but not limited to, digital images, photographs, video and vector drawings can be stored in the first database. Alternatively, the disclosed method may store a number of other types of media files known in the art in the first database. While conventional media search systems may offer huge databases containing a large number of media files for conducting media file searches, unlike the disclosed method, the conventional search systems are often unable to offer accurate and speedy media file searches. The relationship between the first database and the second database is described in detail in conjunction with FIG. 4.

Figure 4:
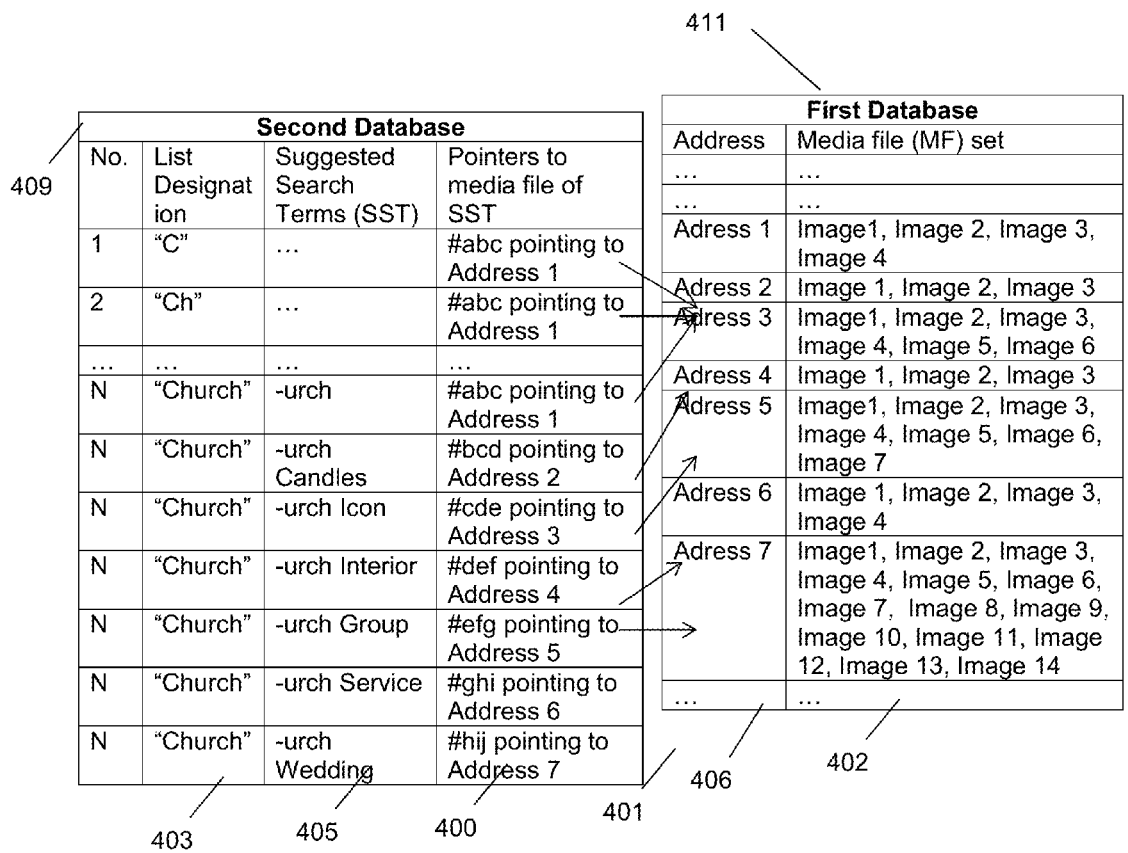
FIG. 4 is a block diagram illustrating attributes of a first database and a second database.

Now referring to FIG. 4 illustrating an example of a first database and a second database. The first database 411 is linked to the second database 409. The second database 409 may include a counter 401 that identifies a record from a number of records in the second database 409. In the illustrated example, the second database 409 contains N number of records. Each record in the second database 409, has an associated list designation 403. List designation 403 can be an alphanumeric string representing a partial search term or a complete search term. For example, second database 409 contains a first record where the list designation 403 is "C", a second record where the list designation 403 is "Ch" and Nth record where the list designation 403 is "Church." For each list designation 403, second database 409 includes at least one corresponding suggested search term 405. Words are arranged in the list designation field 403 of the second database 409 in an alphabetical manner. Due to space constraints, all of the entries starting with string "Church" are not shown in the second database 409, but typically, if the list designation 403 is "Church" for Nth record in the second database 409, then the following words may appear in the list designation field 403 of (N+1) position of the counter 401: church-state, church bench, church dome, church goer, church going, church haw, Churchill etc. A drastic shift in the scope of a search resulting from a slight change in the user input is illustrated above in conjunction with FIG. 9 and FIG. 10.

For each list designation 403, a set of suggested search terms 405 is listed in the second database 409. The set of suggested search terms 405 may contain one or more search terms, for example seven suggested search terms 405 are listed for the Nth record in the second database 409. Each suggested search term of the suggested search terms 405 has an associated pointer 400 that points to a media file set containing media files that represent the given suggested search term. It will be appreciated that pointer 400 pointing to address 1 (address 1 is located in the first database 411), where an image of church is stored, appears three times in the second database 409, where list designation 403 is "C", "CH" and "Church." This redundancy facilitates faster searching of media files. Thus far, the conventional media search systems were unable to benefit from this redundancy due to prohibitively high costs of electronic storage space.

In one embodiment of the disclosed method, there are 4 media-type indexes, each with 900,000 search prefixes leading to 180,000 different result sets, comprising a total of 2 million photos and using 4 GB of RAM. The programming language and underlying operating system automatically handles load across multiple CPUs and available RAM memory. This approach in fitting all records into physical memory to maximize speed was not possible in the past. Presently, higher capacity hardware has become available at very affordable cost, which greatly supports the implementation of the disclosed method.

The media files associated with the suggested search terms 405 are located in the first database 411. The first database 411 may include an address 406, where a media file set 402 is stored. The first database 411 also includes description 407, which describes the associated media file set 402. The use of list designation 403, suggested search terms 405, pointers 400 in the second database 409 and address 406, media file set 402 and description 407 in the first database 411 is illustrated in FIG. 4.

In one embodiment, the method may maintain a second database comprising a set of search terms that are related to the term searched by the user. Thus, the second database comprising a plurality of lists, each list comprising a list designation, an alphabetized set of pre-computed related search terms, and a set of associated pointers is maintained. The set of associated pointers is configured such that for each related search term in the list, the associated pointer points to the media file set in the first database that is associated with the related search term.

In this embodiment, a first database comprising a first set of records, each record comprising a media file set and a set of descriptive terms associated with the media file set may be maintained. Optionally, the first database may store the media files from highest to lowest degrees of popularity. In other words, if a media file set is related to a popular search term, the media file set is stored at a preferred location in the list. Alternatively, if a media file set is related to least popular search term, then the media file set is stored at a least preferred location in the list.

In this embodiment, upon receiving the user search request, the method may query the second database to detect the list, wherein the associated list designation of the list is identical to the received search request. Next, the method may identify the set of related search terms in the detected list, and for each related search term in the identified set of related search terms, the method may identify a pointer associated with the related search term from the set of associated pointers in the detected list. Then the method may query the first database using the identified pointer to retrieve the media file set and the descriptive terms associated with the related search term, and may dynamically update the user interface by displaying the retrieved media file set and the descriptive terms associated with the related search term on the user interface.

In one embodiment, the retrieved media file set and the descriptive terms associated with the related search term are displayed on the user interface after sorting the search results by popularity of the search results. In that, an image associated with most popular search term is displayed at a most preferred location of the user interface and an image associated with least popular search term is displayed at a least preferred location of the user interface. In another embodiment, the method may store in the second database an alphabetized set of pre-computed synonymous search terms, perform search and display results for synonymous search terms.

In another embodiment, the method simultaneously displays a set of thumbnail images of the retrieved media file set and the descriptive terms associated with the related search term on the user interface. In another embodiment, the method may dynamically display thumbnail images of the retrieved media file set and the descriptive terms in a main viewing area of the user interface, and simultaneously display a list of related terms in a drop down list format on the user interface. In yet another embodiment, depending upon a user configuration, a set of priorities for searching media files in a specific format may be defined. A user, for example, may set a high priority for 3D images than for video media or photographs. Accordingly, 3D images are searched first, and displayed first, if 3D images are available. Video media or photographs are searched only if 3D images are not available for the searched term.

Now referring back to FIG. 1. At block 104, the method iteratively receives a search request entered by a user via a user interface. Then, each received search request is parsed to determine a type of media the user is seeking to search. It is noted that the method iteratively receives a search request from a user. The user input may be in the form of a keystroke entered on the user interface or a media file representation being selected on the user interface. A keystroke can be an alphanumeric character entered by the user in the search box located on the user interface. Alternatively, the keystroke may also be a click event, where a user may click on an icon/thumbnail representation of a media file displayed on the user interface. A new page displaying the image represented by the clicked icon is launched in a new window. Then user may perform many actions such as the user may download the image, add the image to the saved images file or view image details.

Further, keystroke can also be user clicking on a link "more like this" situated next to an icon/thumbnail representation of a media file. When user clicks on "more like this link" a new search is automatically conducted without user entering anything in the search box, and result for the new search are displayed in the subsequent page. Notably, the suggested term associated with the link "more like this" appears in the search box on the results page.

In one embodiment, the method returns search results containing a large number of media files stored in the first database with every keystroke entered by the user. In other words, for each character represented by the keystroke entered by the user, the method (1) pre-generates a list of suggested search terms and (2) retrieves media files associated with the suggested search results.

After receiving the first search request communicated via the keystroke, the method may determine whether the search request is a partial search term or the user has clicked on an icon displayed on the user interface. In the preferred embodiment of the present disclosure, the search request entered by the user is a partial search term, and by merely entering the partial search term, the method provides a suggested completion of search request. Accordingly, a possibility exists that a subsequent keystroke may completely change a scope of a search. For example, until a user enters keystroke representing letter "i" after search term "church" the scope of search may shift from church related terms to terms related to Churchill, such as Churchill Downs, Churchill quotes, Churchill history etc.

Thereafter, the method may determine if the user has concluded the search request submission at block 106. If the user has concluded the search request submission at block 106, then the method may exit at block 114. Alternatively, if the user has not concluded the search request submission, then the method may proceed to block 108. At block 108 the second database is queried to detect the list corresponding to the received search request. In other words, for each received search request, the second database is searched to detect the list, whose associated list designation begins with the received search request. For example, if at the user interface, the user enters text string "church" as the search request, a list whose associated list designation begins with word "church" are identified. This list may contain suggested search terms such as: "church icon," "church tutoring," "church interior," "church service," "church group," and "church wedding." This concept is further described in detail in conjunction with FIG. 3.

In one embodiment of the present disclosure, the method observes and keeps track of the user idiosyncrasies. In addition to considering each keystroke entered by the user, the method also considers the user profile before presenting suggested search terms. Thus, in addition to considering a pre-computed list of suggested search terms, the disclosed method also considers user profile and presents suggested search terms to the user based on user idiosyncrasies. The disclosed method may consider user idiosyncrasies including but not limited to user's sex, age, profession, social affiliation, financial status, and purchase habits etc.

At block 110, the set of suggested search terms in the detected list is identified. In the aforementioned example, the list of suggested search terms may include six terms: church icon, church tutoring, church interior, church service, church group, and church wedding. Thereafter, at block 112, each of the six suggested search terms are processed. The details of the search term processing are described in detail in conjunction with FIG. 2. Upon completing the processing of each of the suggested search terms at block 112, the method returns to block 104. If the user has not concluded the search request submission at block 106, then the method proceeds to block 108. Alternatively, if the user has concluded the search request submission at block 106, then the method exits at block 114.

Figure 2:
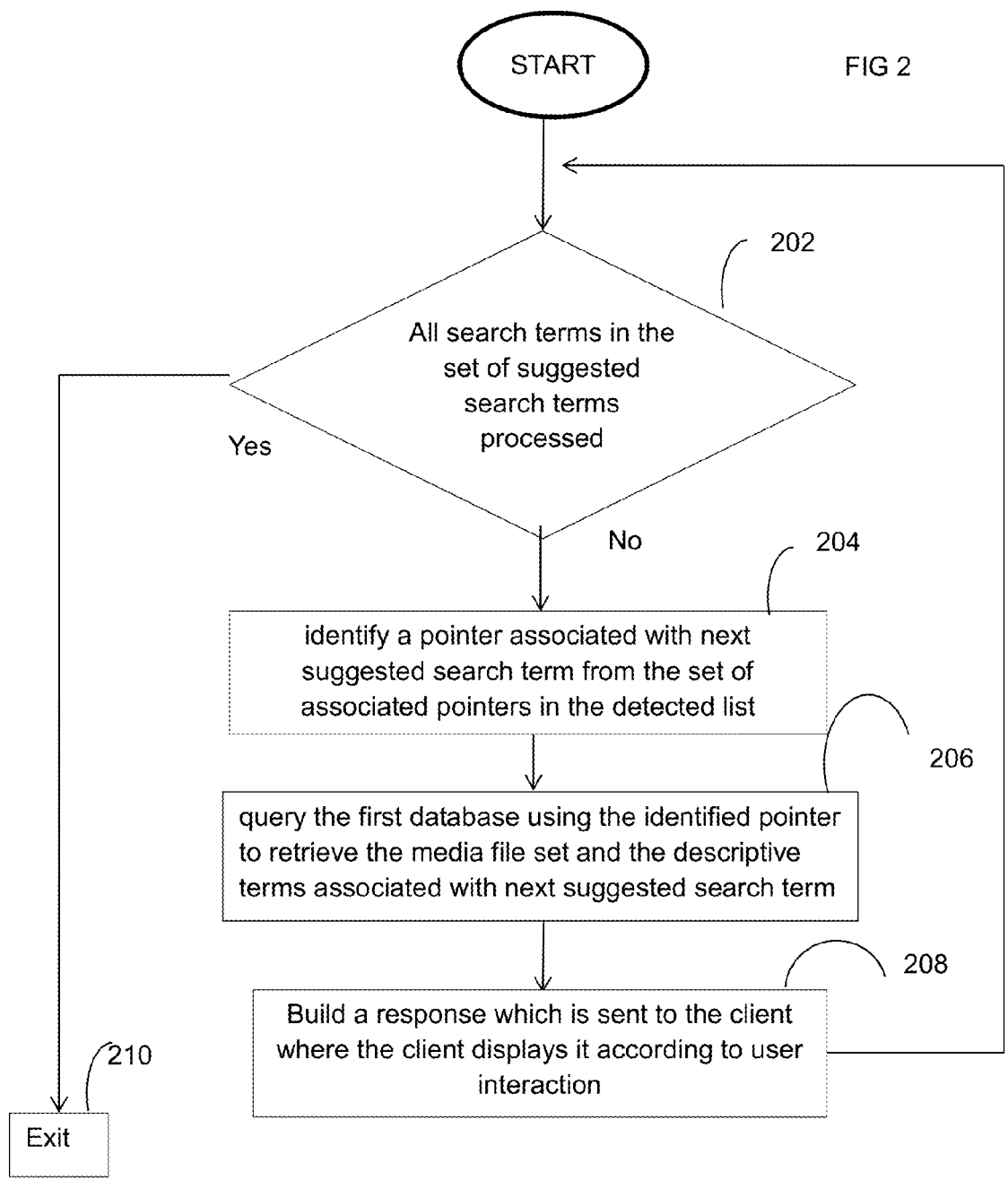
FIG. 2 illustrates a state diagram showing operations performed in the processing a set of suggested search terms.

FIG. 2 is a state diagram showing operations performed in processing the suggested search terms at block 112 in FIG. 1.

At block 202, the method may determine whether all of the search terms in the set of suggested search terms are processed. If the method determines that all of the search terms in the set of suggested search terms are processed, then the method may exit at block 210. Otherwise, if the method determines that all of the search terms in the set of suggested search terms are not processed, then the method may proceed to block 204. The method may begin processing the next suggested search term by querying the second database to identify, from the set of associated pointers in the detected list, a pointer associated with the next suggested search term at block 204. Then the first database is queried using the identified pointer to retrieve the media file set and the descriptive terms associated with the next suggested search term at block 206. Subsequently, at block 208, the retrieved media file set and the descriptive terms associated with the next suggested search term is displayed on the user interface. In the preferred embodiment, multimedia representations of the next suggested search term displayed on the left side of the user interface and thumbnail images of additional search term suggestions are displayed on the right side of the user interface.

The disclosed method and system omits some of the elements in the existing media search systems in order to simplify the media searching, without sacrificing the associated searching capabilities. For example, in the existing media search systems, a user may start searching for a media file, and subsequently, the user may realize that a different word positioned at the beginning of the search request might have been more effective. User of a traditional media search system typically comes to this realization after sequentially entering several queries and after reviewing the results each of several queries. In contrast, the disclosed method provides a visual representation of results from other potential search queries on the very first page load. This saves the valuable system and human resources required for both entering several queries one after the other and reviewing results of the several queries.

Typically, creative users who often search for media files are visual thinkers. Accordingly, media file search results may be displayed right beneath the listing of the related terms, so the search results can be quickly reviewed or visually scanned by creative users. Thus, the disclosed method and system adds value to the user experience by affording the ability to view maximum number of images in the pre-allotted screen space occupied by the user interface. For example, the disclosed method and system makes it possible to view twenty times as many images as a user might otherwise see using the existing media search systems. The ability to browse more images creates an additional need to make it easier to save an image for subsequent use. Therefore, the disclosed method and system introduces the concept of starring images, which is a simple way to keep track of user experience without having to create a light box.

In the preferred embodiment, a set of thumbnail images of the retrieved media file set and the descriptive terms associated with the suggested search term are simultaneously displayed on the user interface. The set of thumbnail images of the retrieved media file set and the descriptive terms associated with the suggested search term are displayed on a first designated portion of the user interface and the set of thumbnail images of a media file set and a set of descriptive terms associated with related search terms are displayed on a second designated portion of the user interface.

In another embodiment, the retrieved media file set and the descriptive terms associated with the suggested search term are displayed after sorting the retrieved media file set according to a user defined sorting criteria, wherein the user defined sorting criteria comprises at least one of the following: cost associated with the suggested search term, color of images of the retrieved media file set, and degree of popularity of the suggested search term. After displaying the multimedia representations of the suggested search terms on the user interface, the method returns back to block 202.

At block 202 the method may determine whether all of the search terms in the set of suggested search terms are processed. If the method determines that all of the search terms in the set of suggested search terms are processed, then the method exits at block 210. Otherwise, if the method determines that all of the search terms in the set of suggested search terms are not processed, then the method proceeds to block 204. This cycle continues until all of the search terms in the set of suggested search terms are processed. After exiting at block 210, the method returns to block 104 in FIG. 1.

Figure 3:
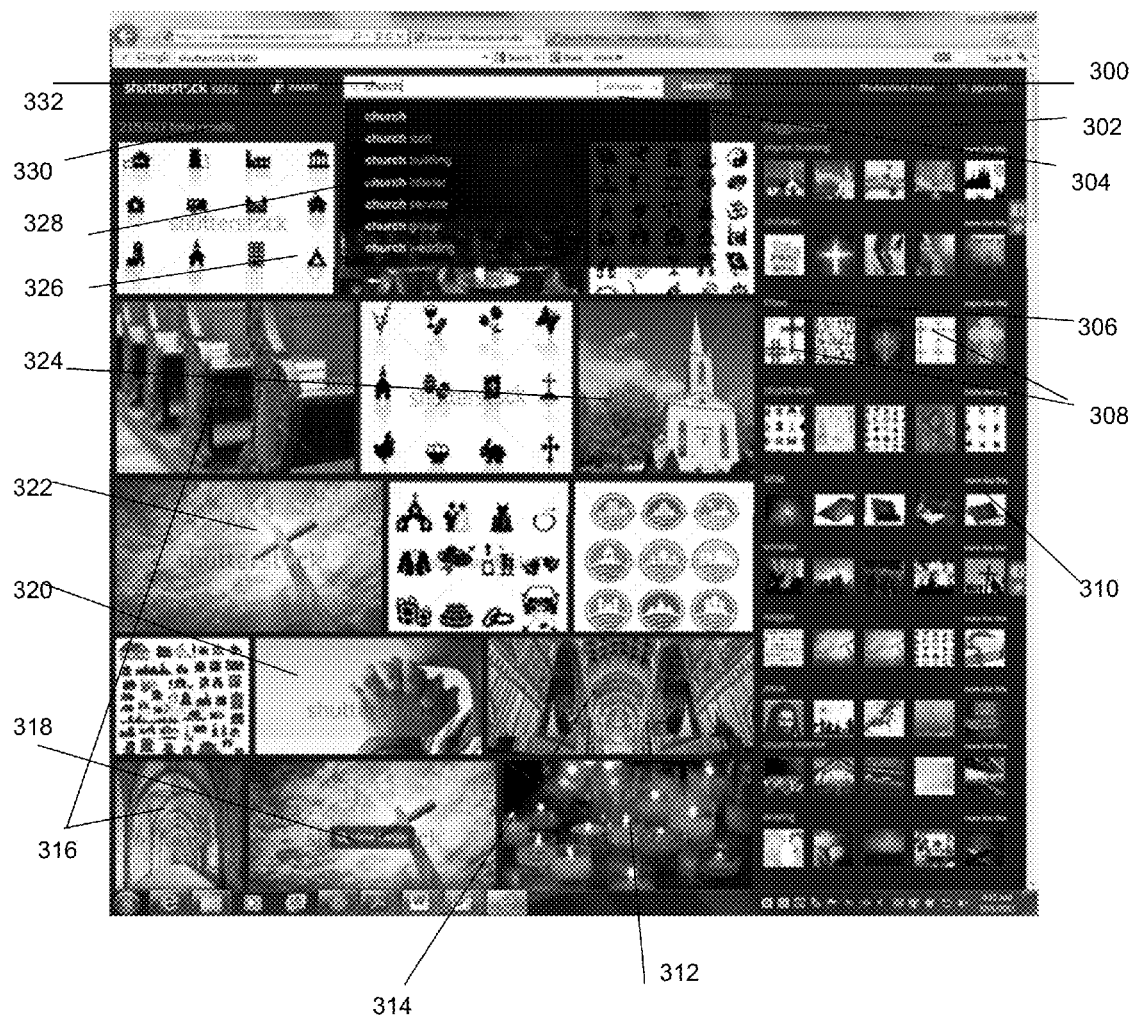
FIG. 3 is a screen shot of the user interface displaying search results of the disclosed search method.

Now referring to FIG. 3, which is a screen shot of one embodiment of disclosed search method. This interface demonstrates the functionality of initiating the search by entering a search request, and displaying the search results.

In particular FIG. 3 illustrates a process of receiving a search request entered by a user via a user interface, block 104 of FIG. 1. FIG. 3 also depicts the process of displaying the retrieved media file set and the descriptive terms associated with suggested search term on the user interface illustrated in block 208 of FIG. 2.

FIG. 3 is an illustrative example of one implementation of the disclosed method. A user input box 332 is provided on the user interface. A user input can be specified by entering a search request in the user input box. As described above, the entered search request can be a partial or a complete search request. The user interface may have a user configuration setting where the user may turn the autocomplete feature of the disclosed method on or off. FIG. 3 is a screenshot of the disclosed method implementation when the autocomplete setting is turned on by the user, and when the user enters a search request for word "church." It is noted that when the screenshot of FIG. 3 is displayed on the user interface, the search button 300 may or may not be selected by the user. The user may specify a type of media file being searched by selecting one option from the drop down list 304. A number of other types of media files known in the art may also be searched using the disclosed invention.

The user interface in FIG. 3 illustrates results generated when the search request "church" is entered in the user input box 332. In the drop down search box 328, seven suggested search terms are being offered as the user enters the search term "church" they as: "church icon," "church building," "church interior," "church service," "church group," and "church wedding." Location 330 on the interface may display total number of media files retrieved as search result. In this case, 218,627 files are retrieved for the searched term "church." The left two thirds portion of the user interface displays multimedia images for the searched term "church". Images 326 and 322 represent a church icon, image 324 indicates church building, images 314 and 316 depict church interior, and images 320 and 312 represent church service. The interface allows the user to view larger size images by clicking on "view larger" button 318.

FIG. 3 illustrates the preferred embodiment of present disclosure, wherein the thumbnail images 308 of the search term suggestions 302 are displayed on the right one thirds portion of the user interface. The suggested search term 306 that is associated with the thumbnail images 308 is displayed in proximity with the thumbnail image 308. By selecting button "more like this" 310 user can refine the media file search to locate more media files that are similar to the suggested search term 306, which is associated with the thumbnail images 308. A new search, that is somewhat related to the current search, can be initiated by a user by clicking on "more like this" button 310 situated next to the suggested search term 306. When user clicks on "more like this" button 310, a new search is automatically conducted without user entering anything in the search box, and result for the new search are displayed in the subsequent page. Notably, the suggested term 306 associated with the link "more like this" appears in the user input box 332 on the subsequent page.

In one embodiment of the present invention, a media repository may be responsible for storing and managing various data repositories associated with the disclosed method. In this embodiment, a Lexicon repository may represent a particular lexicon of common language terms from English language. Alternatively, the lexicon repository may contain search terms from one or more of a plurality of languages. In one embodiment, the disclosed method has an ability to translate search terms to and from various languages. In this embodiment, an Image repository may contain various types of digital image files including but not limited to JPEG/JFIF, JPEG 2000, Exif, TIFF, RAW, GIF, BMP, PNG, PPM, PGM, PBM, PNM, PFM, PAM, WEBP files. In this embodiment, a Video file repository may contain various types of video files including but not limited to .MPG, .MOV, .WMV, MP4, and .RM files. Similarly, a Vector Image repository may contain various types of vector image files including but not limited to .EPS, .AI, and .SVG files. A Media repository may contain additional media types such as audio media files including but not limited to .Wav, .AIF, .MP3, and .MID files; 3D Image files including but not limited to .OBJ, .STP, .MA files and the like. The aforementioned Media repositories along with many other repositories can be stored in various databases associated with the disclosed system. In one embodiment, the system may include a database containing the first database and the second database of suggested search terms, related search terms and synonymous search terms.

Figure 5:
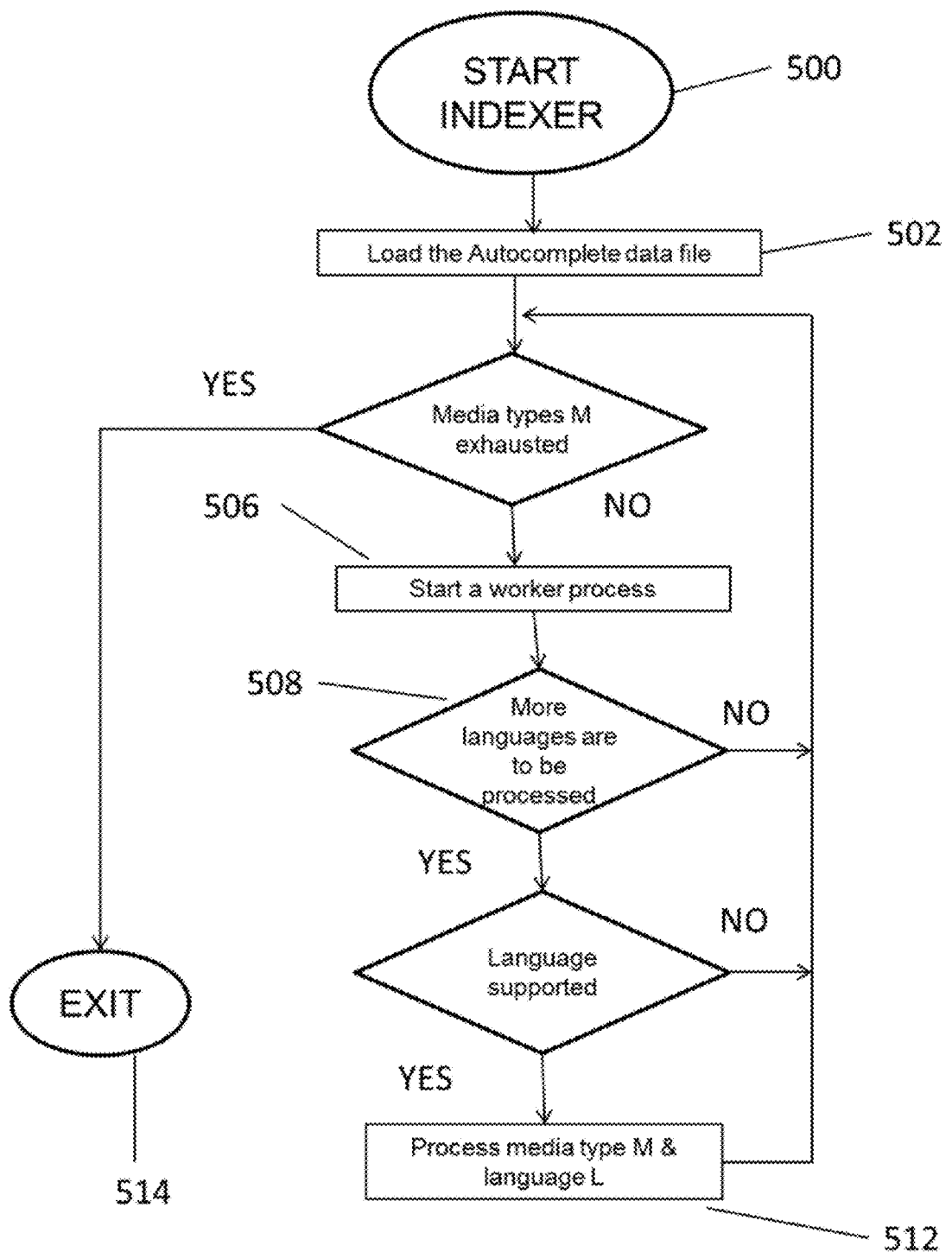
FIG. 5 is a state diagram showing operations performed in the processing different media types using an autocomplete data file.

Redundancy is accomplished in the disclosed method by storing data at various locations for easy access and fast retrieval. Additionally, traditional database optimization techniques such as database tuning, creating non-clustered indexes on frequently used search criteria, defragmenting indexes etc. are employed in the disclosed method to allow fast access to the searched media files and accurate retrieval of the searched media files. Other techniques known in the art can also be applied to the instant method to conduct fast and accurate search. Now referring to FIG. 5 depicting a state diagram showing operations performed in processing different media types using an autocomplete data file. The process begins at step 500 when an indexer is started. At step 502, the autocomplete data file is loaded in the system. A determination is made if all of the media types M are exhausted at step 504. The disclosed system may, in one embodiment, store an array of available media types. In this embodiment, at step 504, it is checked if all media types in the array of available media types are processed. If all media types in the array of available media types are processed, then the process exits at step 514. Otherwise, if some of the media types in the array of available media types are not processed as yet, then a worker process is started at step 506. At this step, a particular worker process is spawn for a given media type M. At step 508, a determination is made if more languages are to be processed. If all of the languages in the autocomplete data file are processed, then the process returns to step 504. Otherwise if, at step 508, a determination is made that some of the languages in the autocomplete data file are yet to be processed, then the process moves to step 510. At step 510, the method identifies next language L in the autocomplete data file, and determines if the identified next language L in the autocomplete data file is supported by the instant system. At step 510, if next language L in the autocomplete data file is supported by instant system, then the process moves to step 512, where the system processes media type M and language L. The manner in which this processing takes place is explained in detail in FIG. 6. However, if at step 510, if it is determined that next language L in the autocomplete data file is not supported by instant system, then the process moves to step 508, where the system identifies next language L in the autocomplete list. Accordingly, the process continues until the system processes all of the media types M and all the languages L that are supported by the instant system.

Figure 6:
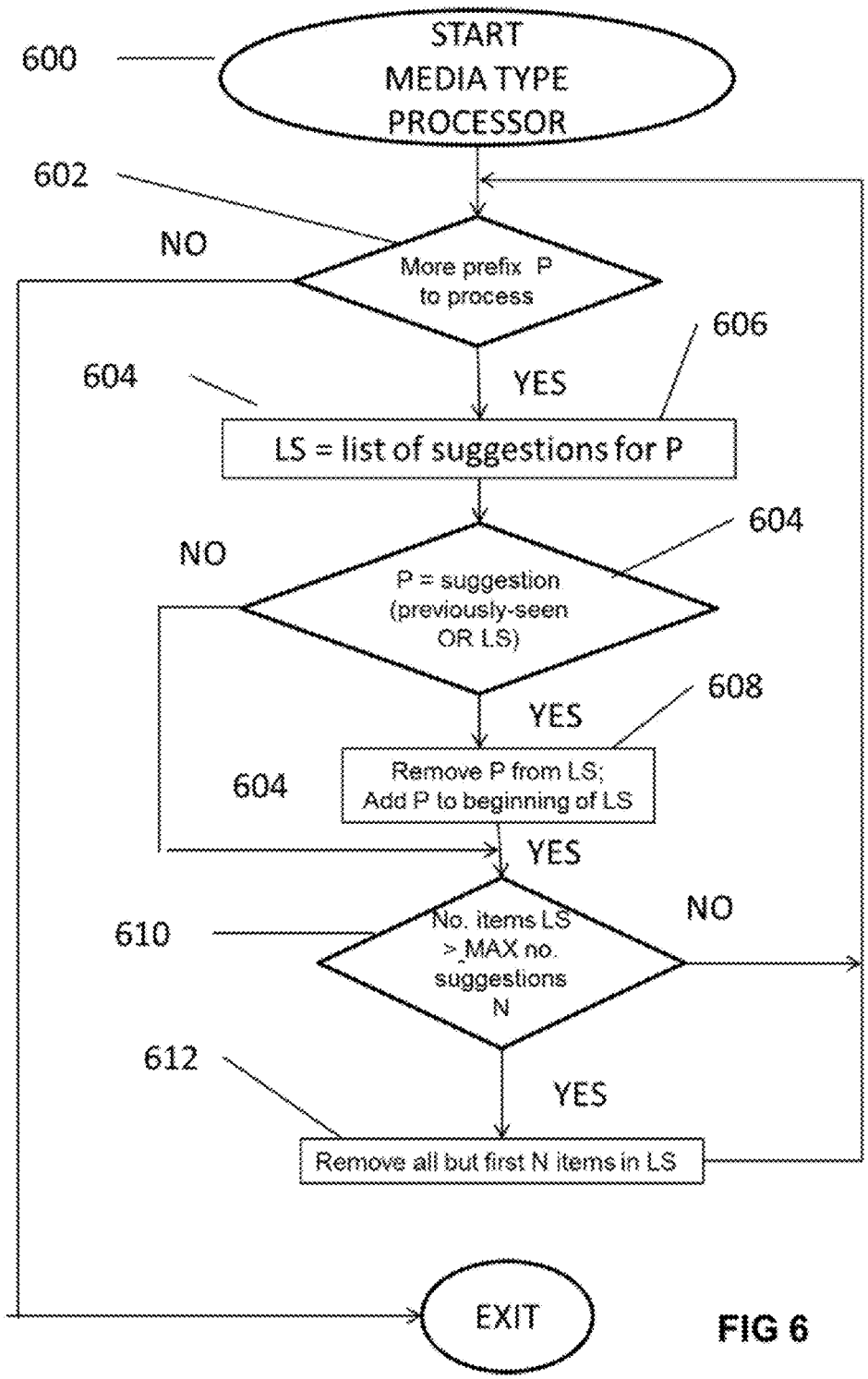
FIG. 6 is a flow chart indicating manner in which media type M and language L may be processed by the disclosed method.

Referring now to the disclosed method in more detail, in FIG. 6 indicating manner in which media type M and language L may be processed by the disclosed method. This flow chart depicts a set of operations performed at step 512 in FIG. 5. A media type processor is started at step 600. At step 602, it is checked if more prefixes P are to be processed. If some of the prefixes P in the autocomplete index for language L are not yet processed, then the process moves on to step 604. At step 604, the process determines a list of suggestions LS for prefix P in autocomplete index. Then, at step 606, the process determines if prefix P is a previously seen suggestion, or if prefix P is one of the suggestion in the list of suggestions. If either of the two conditions are true, then the process moves to step 608 to remove prefix P from the list of suggestions, and to add prefix P to the beginning of the list of suggestions. Alternatively, if both conditions in step 606 are false, then the process moves to step 610. Further, at step 610, the process determines if the number of items in list of suggestions is greater than the maximum number of suggestions N that the list of suggestions can hold. If it is determined that the number of items in list of suggestions is greater than the maximum number of suggestions N, then the step moves on to step 612, where the process removes all but the first N items from the list of suggestions. Alternatively, if the number of items in list of suggestions is less than or equal to the maximum number of suggestions N, then the step moves back to step 602. At step 602, if each prefix P in the autocomplete index for language L has been processed, then the process exits at step 614, otherwise, as described above, the process moves on to step 604.

Figure 7:
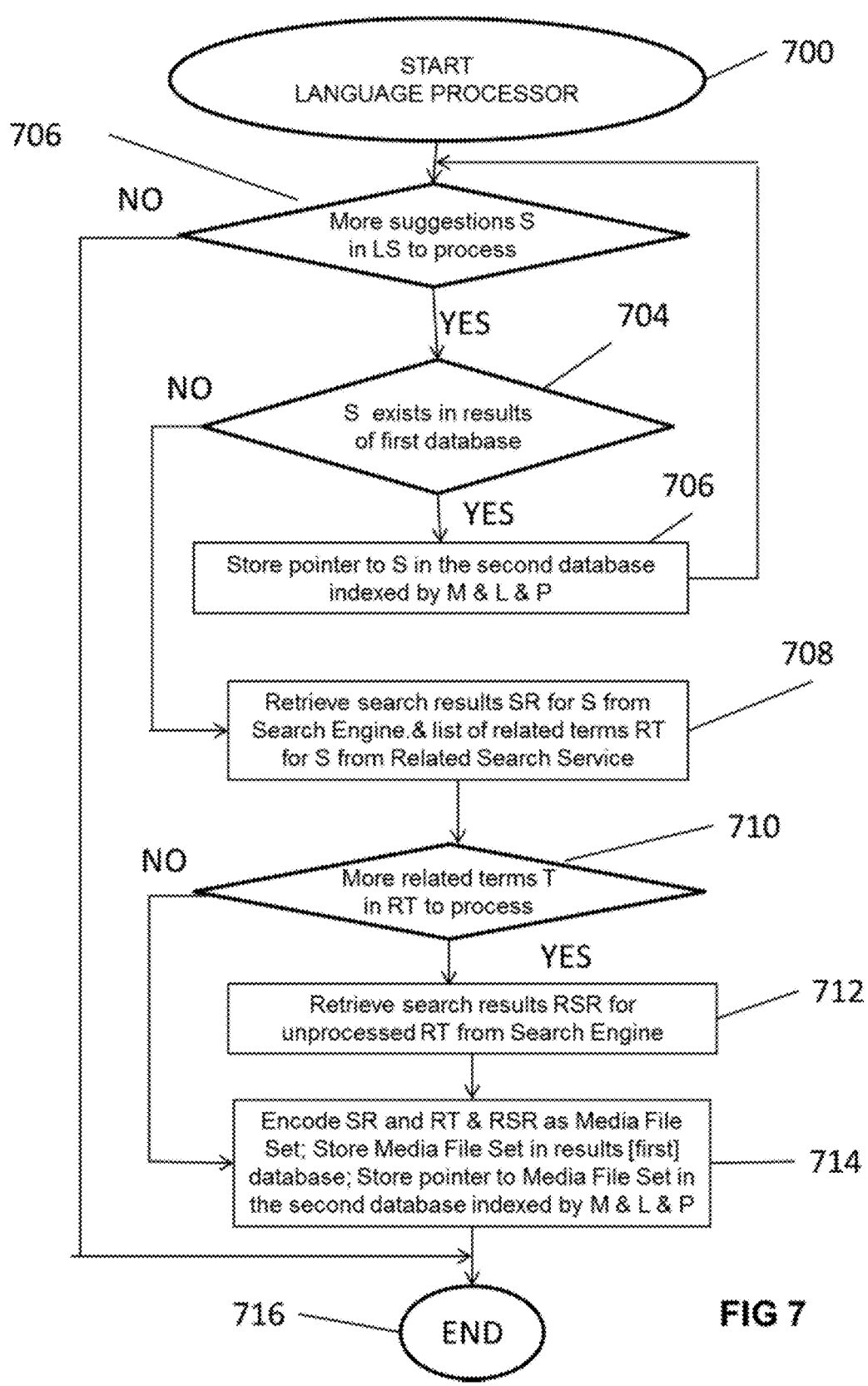
FIG. 7 is a flow chart depicting manner in which each suggestion S in the list of suggestion may be processed by the disclosed method.

Referring now to FIG. 7, illustrating a flowchart representing a manner in which each suggestion in the list of suggestion may be processed by the disclosed method. At step 700, a language processor is initiated. At step 702 it is checked if more suggestions S in the list of suggestions LS are to be processed. If each of the suggestions S in the list of suggestions has been processed, then the process exits at step 716. Otherwise, if some of the suggestions S in the list of suggestions are not yet processed, then the process moves to step 704. At step 704, the process determines if suggestion S exists in a first database. The process moves to step 706 if suggestion S exists in the first database. Next, at step 706, the process stores pointer to suggestion S in the second database, wherein the second database is indexed by media type M, language L and prefix P. Alternatively, if suggestion S does not exist in the results of first database, the process retrieves search results SR for suggestion S from Search Engine and retrieves a list of related terms RT for suggestion S from Related Search Service at step 708. Then the process moves to step 710, at this point a determination is made if more related terms T from the list of related terms (which was retrieved in step 708) are to be processed. If none of the related terms T remain unprocessed, then the process moves to step 714. Otherwise, if some of the related terms T remain unprocessed, then the process moves to step 712. At step 712, the process retrieves search results RSR for unprocessed related terms from Search Engine. In one embodiment, after step 712, the process returns to check if more related terms T from the list of related terms are to be processed. After processing all of the related search terms from the list of related terms, the process moves to step 714. At step 714, the process encodes search results SR, list of related terms RT (from step 708), and retrieved search results RSR (from step 712) as a Media file set. Also in this step, the process stores the Media File Set in the first database while storing pointer to the Media File Set in the second database which is indexed by media type M, language L and prefix P. Thereafter, the process ends at step 716.

Indexer used by the disclosed method can be an offline processing part which gathers the data from various places such as autocomplete repository, related searches repository, synonymous searches repository, and the like. The indexer may collect relevant data and pre-compute the necessary first database and the second database for conducting subsequent rapid searches. The aforementioned steps shown in FIG. 5 are all part of the indexer flow, which may be a sequential flow. The output of the steps illustrated in FIG. 5, FIG. 6 and FIG. 7 is the first database and the second database.

Figure 8:
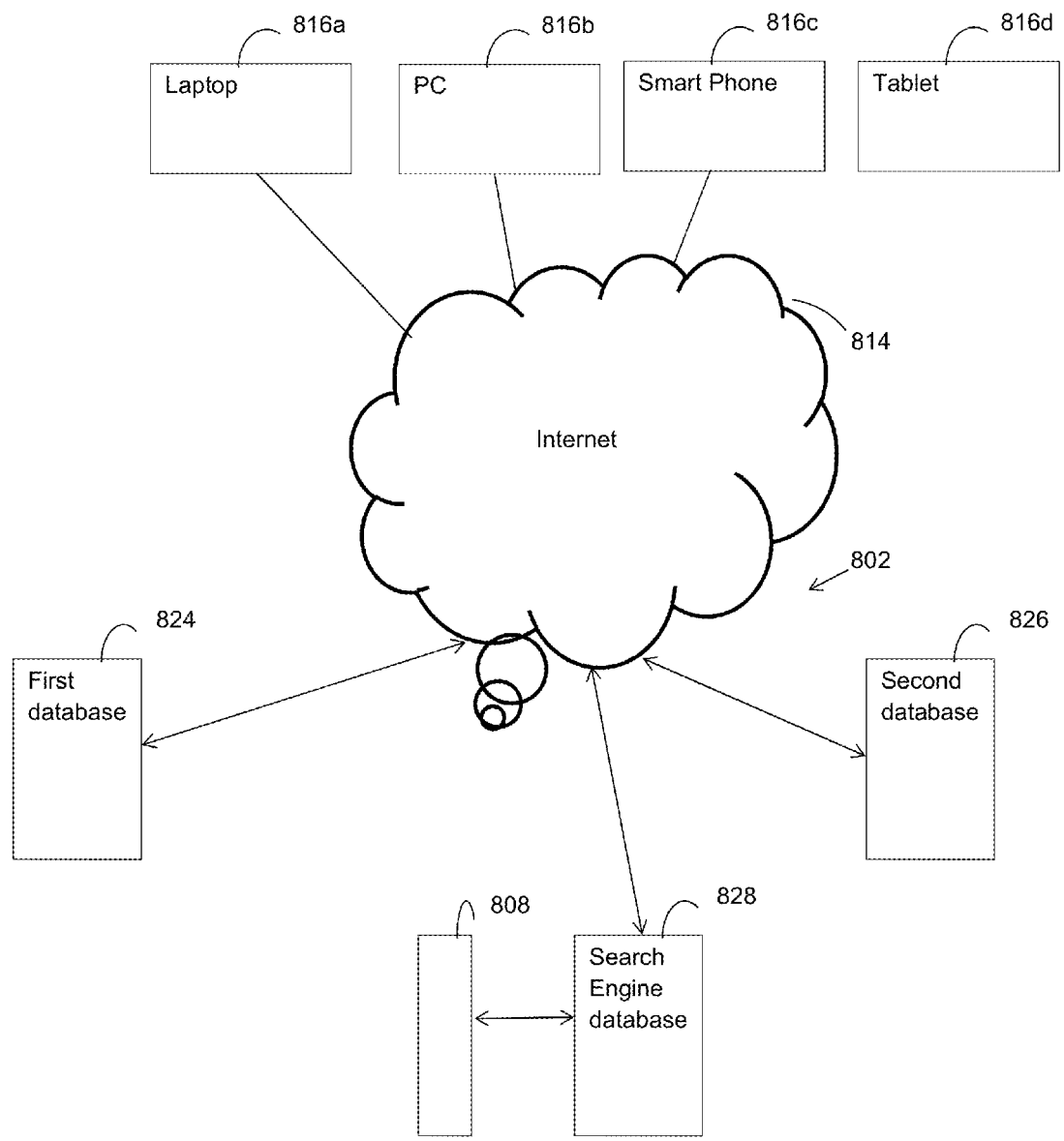
FIG. 8 is a block diagram of the components associated with the disclosed electronic search system.

FIG. 8 is a block diagram of the disclosed search system 800. FIG. 8 is an example of the distributed system 800 configured as client/server architecture used in the preferred embodiment of the disclosed system. A client is a member of a class or group that uses the services of another class or group to which it is not related. A server is typically a remote computer system that is accessible over a communications medium such as the Internet. The client process may be active in a second computer system, and communicate with the server process over a communications medium that allows multiple clients to take advantage of the information-gathering capabilities of the server. Thus, the server essentially acts as an information provider for a computer network.

The block diagram of FIG. 8 shows an electronic search system for rapid retrieval of searched media files 800. A computer image search system for rapid retrieval of media files images corresponding to a sequence of input display commands, the system is disclosed. The system comprises a programmable data processor operating under the control of a program to convert the display commands into data entries in an array of multi-bit data characters and words, each entry of the array corresponding to a set of descriptions of the image to be displayed; and a scanned-raster display device for generating illuminated points on a display surface in response to applied data signals causing the programmable data processor to perform a set of operations described below. The system 800 includes a first database server 824, a second database server 826, and a search engine web server 808 and an associated search engine database 828, and a plurality of client devices 816 such as a searcher's laptop 816a, a searcher's personal computer 816b, searcher's smart phone 816c, and searcher's tablet 816d, all of which are connected to a network such as the Internet 814. Alternatively, client devices can also be an iPod, an iPad and the like.

First database 824 comprising a first set of records, each record comprising a media file set and a set of descriptive terms associated with the media file set. Second database 826 comprising a second set of lists, each list comprising a list designation, an alphabetized set of pre-computed suggested search terms and a set of associated pointers, wherein for each suggested search term in the list, the associated pointer points to the media file set associated with the suggested search term, and wherein the media file set is stored in the first database.

The network 814 will be hereinafter generally referred to as the Internet. Although the disclosed system and method are specifically useful for the Internet, it should be understood that the client devices 816a, 816b, and 816c, first database servers 824, second database servers 826, and search engine web server 808 may be connected together via one of a number of different types of networks. Such networks may include local area networks (LANs), other wide area networks (WANs), and regional networks accessed over telephone lines, such as commercial information services. The client and server processes may even comprise different programs executing simultaneously on a single computer. First database servers 824, second database servers 826, and search engine web server 808 and their associated storage device comprise a disclosed search system 802 as described herein.

The client computers 816 can be conventional personal computers (PCs), workstations, or computer systems of any other size. Each client 816 typically includes one or more processors, memories, input/output devices, and a wired or wireless network interface, such as a conventional modem or network interface card. The first database servers 804, second database servers 806, and the search engine web server 808 can be similarly configured. However, first database servers 804, second database servers 806, and search engine web server 808 may each include many computers connected by a separate private network.

The client computers 816 can execute web browser programs, such as the NAVIGATOR, EXPLORER, or MOSAIC browser programs, to locate the media files stored on first database server 824. The browser programs allow the users to enter addresses of specific web pages to be retrieved. In one embodiment, client computers 816 communicate through the network with various network information providers, including second database servers 806, search engine server 808, and first database servers 804 using the functionality provided by a Hypertext Transfer Protocol (HTTP), although other communications protocols, such as FTP, SNMP, TELNET, and a number of other protocols known in the art, may be used. Preferably, search engine server 808, second database servers 806, and first database servers 804 are located on the World Wide Web.

The second database server 826 comprise computer storage medium 820 and a processing system (not shown in FIG. 8). Second database 826 is stored on the storage medium 820 of the second database server 826. The database contains suggested search term related information as discussed in detail in conjunction with FIG. 4. It will be appreciated from the description below that the system and method described herein may be implemented in software that is stored as executable instructions on a computer storage medium, such as memories or mass storage devices, on the second database servers 826. Conventional browser programs, running on client computers 816, may be used to access suggested search term information stored on second database servers 806. Preferably, access to the second database servers 826 is accomplished through a firewall, not shown, which protects information used to autocomplete search requests based on the searcher's personal preferences data from external tampering. Additional security may be provided via enhancements to the standard communications protocols such as Secure HTTP or the Secure Sockets Layer.

The search engine web server 808 stores and executes a search engine program that permits network users, upon navigating to the search engine web server URL or sites on other web servers capable of submitting queries to the search engine web server 808 through their browser program, to type keyword queries to locate media files of interest among the millions of media files available in the first database 824.

The search engine servers 808 are configured to iteratively receive a search request entered by a user via a user interface until the user concludes the search request submission. Upon receiving the search request, the search engine servers 808 may query the second database to detect the list, wherein the associated list designation of the list begins with the received search request. The search engine servers 808 may then identify the set of suggested search terms in the detected list, and perform a set of operations 818 not shown, for each suggested search term in the identified set of suggested search terms.

In a preferred embodiment of the present invention, the set of operations 818 performed by the search engine web server 808 includes identifying a pointer associated with the suggested search term from the set of associated pointers in the detected list, querying the first database 824 using the identified pointer to retrieve the media file set and the descriptive terms associated with the suggested search term. Thereafter, search engine web server 808 generates a search result list that may include, at least in part, retrieved media files and instructions to display the retrieved media files on the user interface. The search engine web server 800 transmits the search results, in the form of a web page, to the network user, where it is displayed on the user interface in the browser window running on the client device 816.

A client server, associated with the user devices 816, not shown in FIG. 8 then executes the instructions to display the results on the user interface sent by search engine web server 800 to display the retrieved media file set and the descriptive terms associated with the suggested search term on the user interface. Search engine web server 808 is connected to the Internet 814. In one embodiment, search engine web server 808 includes a search database including search listing records used to generate search results in response to user queries. In addition, search engine web server 808 may also be connected to the second database servers 806. Second database servers 806 may also be connected to the Internet 814.

Search engine web server 808 is further configured to perform the operations of maintaining the first database, maintaining the second database, iteratively receiving the search request, querying the second database to detect the list wherein the associated list designation of the list begins with the received search request, identifying the set of suggested search terms in the detected list, identifying a pointer associated with each suggested search term, and using the identified pointer to retrieve the media file set and the descriptive terms associated with the suggested search term from the first database. A set of client servers 820, located at a remote location and associated with the user devices 816, not shown, is configured to perform the displaying the retrieved media file set and the descriptive terms associated with the suggested search term on the user interface of the devices 816.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A computer image search system, the system comprising:
   a programmable data processor operating under the control of a program to convert the display commands into data entries in an array of multi-bit data characters and words, each entry of the array corresponding to a set of descriptions of the image to be displayed; and
   a scanned-raster display device for generating illuminated points on a display surface in response to applied data signals causing the programmable data processor to perform the following operations:
   maintain a first database comprising a first set of records, each record comprising a media file set and a set of descriptive terms associated with the media file set;
   maintain a second database comprising a set of lists, each list comprising a list designation, an alphabetized set of pre-computed suggested search terms and a set of associated pointers, wherein for each suggested search term in the list, the associated pointer points to the media file set associated with the suggested search term, and wherein the media file set is stored in the first database; and
   iteratively receive a search request entered by a user via a user interface until the user concludes the search request submission, and dynamically updating the user interface by performing the following operations for the received search request:
   query the second database to provide a detected list, wherein the associated list designation of the detected list begins with the received search request,
   identify the set of suggested search terms in the detected list, and performing the following operations for each suggested search term in the identified set of suggested search terms:
   identify a pointer associated with the suggested search term from the set of associated pointers in the detected list,
   query the first database using the identified pointer to retrieve the media file set and the descriptive terms associated with the suggested search term, and
   display the retrieved media file set and the descriptive terms associated with the suggested search term on the user interface.

2. The system of claim 1, further configured to parse each received search request to determine a type of media the user is seeking to search, wherein the type of media comprises a photographic image, a vector art, a film or an image sequence.

3. The system of claim 1, wherein the search request entered by the user is a partial search term, and by merely entering the partial search term, the system provides a suggested completion of search request.

4. The system of claim 1, further configured to simultaneously display a set of thumbnail images of the retrieved media file set and the descriptive terms associated with the suggested search term on the user interface.

5. The system of claim 1, further configured to perform the operations of maintaining the first database, maintaining the second database, iteratively receiving the search request, querying the second database to detect the list whose associated list designation begins with the received search request, identifying the set of suggested search terms in the detected list, identifying a pointer associated with each suggested search term, and using the identified pointer to retrieve the media file set and the descriptive terms associated with the suggested search term from the first database, at a server computer located in vicinity of the system and performing the displaying the retrieved media file set and the descriptive terms associated with the suggested search term on the user interface at a client computer located at a remote location.

6. A method for rapid retrieval of searched media files, the method comprising:
   maintaining a first database comprising a set of records, each record comprising a media file set and a set of descriptive terms associated with the media file set;
   maintaining a second database comprising a set of lists, each list comprising a list designation, an alphabetized set of pre-computed suggested search terms and a set of associated pointers, wherein for each suggested search term in the list, the associated pointer points to the media file set stored in the first database that represents the suggested search term;
   iteratively receiving a search request entered by a user via a user interface until the user concludes the search request submission, and dynamically updating the user interface by performing the following steps for each received search request:
   querying the second database to provide a detected list, wherein the associated list designation of the detected list begins with the received search request,
   identifying the set of suggested search terms in the detected list, and performing the following steps for each suggested search term in the identified set of suggested search terms:

identifying a pointer associated with the suggested search term from the set of associated pointers in the detected list, using the identified pointer to retrieve the media file set and the descriptive terms associated with the suggested search term from the first database, and displaying the retrieved media file set and the descriptive terms associated with the suggested search term on the user interface.

7. The method of claim 6, further comprising parsing each received search request to determine a type of media the user is seeking to search, wherein the type of media comprises a photographic image, a vector art, a film or an image sequence.

8. The method of claim 6, wherein the search request entered by the user is a partial search term, and by merely entering the partial search term, the method provides a suggested completion of search request.

9. A method for rapid retrieval of searched media files, the method comprising:

maintaining a first database comprising a first set of records, each record comprising a media file set and a set of descriptive terms associated with the media file set;

maintaining a second database comprising a set of lists, each record comprising a list designation, an alphabetized set of pre-computed suggested search terms and a second set of associated pointers, wherein for each related search term in the list, the associated pointer points to the media file set associated with the related search term, and wherein the media file set is stored in the first database; and iteratively receiving a search request entered by a user via a user interface until the user concludes the search request submission, and dynamically updating the user interface by performing the following steps for the received search request:

querying the second database to provide a detected list, wherein the associated list designation of the detected list begins with the received search request, identifying the set of related search terms in the detected list, and performing the following steps for each related search term in the identified set of related search terms:

identifying a pointer associated with the related search term from the set of associated pointers in the detected list, using the identified pointer to retrieve the media file set and the descriptive terms associated with the related search term from the first database, and displaying the retrieved media file set and the descriptive terms associated with the related search term on the user interface.

10. The method of claim 9, wherein the related search term is a synonym of the search request.

11. The method of claim 9, wherein displaying the retrieved media file set and the descriptive terms associated with the related search term comprises simultaneously displaying a set of thumbnail images of the retrieved media file set and the descriptive terms associated with the related search term on the user interface.

12. The method of claim 10, further comprising dynamically displaying thumbnail images of the retrieved media file set and the descriptive terms in a main viewing area of the user interface, and simultaneously displaying a list of related terms in a drop down list format on the user interface.

13. A computer image search system, the system comprising:

a programmable data processor operating under the control of a program to convert the display commands into data entries in an array of multi-bit data characters and words, each entry of the array corresponding to a set of descriptions of the image to be displayed; and a scanned-raster display device for generating illuminated points on a display surface in response to applied data signals causing the programmable data processor to perform the following operations:

maintain a first database comprising a first set of records, each record comprising a media file set and a set of descriptive terms associated with the media file set;

maintain a second database comprising a set of lists, each list comprising a list designation, an alphabetized set of pre-computed suggested search terms and a set of associated pointers, wherein for each suggested search term in the list, the associated pointer points to the media file set associated with the suggested search term, and wherein the media file set is stored in the first database; and iteratively receive a search request entered by a user via a user interface until the user concludes the search request submission, and dynamically updating the user interface by performing the following operations for the received search request:

query the second database to provide a detected list, wherein the associated list designation of the detected list begins with the received search request, identify the set of suggested search terms in the detected list, and performing the following operations for each suggested search term in the identified set of suggested search terms:

identify a pointer associated with the suggested search term from the set of associated pointers in the detected list, query the first database using the identified pointer to retrieve the media file set and the descriptive terms associated with the suggested search term, and display the set of thumbnail images of the retrieved media file set and the descriptive terms associated with the suggested search term on a first designated portion of the user interface and displaying the set of thumbnail images of a media file set and a set of descriptive terms associated with a related search term on a second designated portion of the user interface.

14. The system of claim 13, further configured to display the retrieved media file set and the descriptive terms associated with the suggested search term after sorting the retrieved media file set according to a user defined sorting criterion, wherein the user defined sorting criterion comprises at least one of the following: a cost associated with the suggested search term, a color of images of the retrieved media file set, and a degree of popularity of the suggested search term.

15. A method for rapid retrieval of searched media files, the method comprising:

maintaining a first database comprising a set of records, each record comprising a media file set and a set of descriptive terms associated with the media file set;

maintaining a second database comprising a set of lists, each list comprising a list designation, an alphabetized set of pre-computed suggested search terms and a set of associated pointers, wherein for each suggested search term in the list, the associated pointer points to the media file set stored in the first database that represents the suggested search term;

iteratively receiving a search request entered by a user via a user interface until the user concludes the search request submission, and dynamically updating the user interface by performing the following steps for each received search request:

querying the second database to provide a detected list, wherein the associated list designation of the detected list begins with the received search request, identifying the set of suggested search terms in the detected list, and performing the following steps for each suggested search term in the identified set of suggested search terms:

identifying a pointer associated with the suggested search term from the set of associated pointers in the detected list, using the identified pointer to retrieve the media file set and the descriptive terms associated with the suggested search term from the first database, and simultaneously displaying a set of thumbnail images of the retrieved media file set and the descriptive terms associated with the suggested search term on the user interface.

16. The method of claim 15, further comprising simultaneously displaying the set of thumbnail images of the retrieved media file set and the descriptive terms associated with the suggested search term on a first designated portion of the user interface and displaying the set of thumbnail images of a media file set and a set of descriptive terms associated with a related search term on a second designated portion of the user interface.

* * * * *